United States Patent [19]

Pachence

[11] Patent Number: 5,138,030
[45] Date of Patent: Aug. 11, 1992

[54] PROCESS FOR EXTRACTING TYPE I COLLAGEN FORM AN AVIAN SOURCE, AND APPLICATIONS THEREFOR

[76] Inventor: James M. Pachence, 7 Chopin Ln., Lawrenceville, N.J. 08648

[21] Appl. No.: 419,496

[22] Filed: Oct. 10, 1989

[51] Int. Cl.$^5$ .......................... A23J 1/10; C07K 3/02; C07K 15/06
[52] U.S. Cl. .................................. 530/356; 530/420; 530/427; 530/840
[58] Field of Search ............... 530/356, 840, 841, 842, 530/420, 427

[56] References Cited

U.S. PATENT DOCUMENTS

| | | | |
|---|---|---|---|
| 3,014,024 | 12/1961 | Lieberman et al. | 530/840 |
| 4,216,204 | 8/1980 | Robertson | 530/827 |
| 4,260,228 | 4/1981 | Miyata | 530/356 |
| 4,427,583 | 1/1984 | England et al. | 530/412 |
| 4,841,962 | 6/1989 | Berg et al. | 128/156 |

FOREIGN PATENT DOCUMENTS

| | | | |
|---|---|---|---|
| 46817 | 4/1979 | Japan | 530/356 |
| 831124 | 3/1960 | United Kingdom | 530/356 |
| 915066 | 1/1963 | United Kingdom | 530/356 |

Primary Examiner—Jeffrey E. Russel

[57] ABSTRACT

A process for extracting type I collagen from an avian source such as poultry feet that incorporates a fibrillar mass of connective tissue as well as bony tissue to yield a collagen product having useful medical and biotechnology applications. In this process, after being cleaned and decontaminated, the poultry feet are comminuted and then enzyme-treated to enhance the yield. The enzyme-treated comminuted material which is rich in collagen is dispersed in an organic acid to cause the fibrillar mass to undergo controlled swelling, after which the mass is separated from the bony tissue and purified to remove non-collangenous material. The purified mass is dried to provide the desired Type I collagen product which may be ground into a powder or formed into a collagen matrix or sponge, depending on the end use therefor.

14 Claims, No Drawings

PROCESS FOR EXTRACTING TYPE I COLLAGEN FORM AN AVIAN SOURCE, AND APPLICATIONS THEREFOR

BACKGROUND OF THE INVENTION

1. Field of Invention

This invention relates generally to a process for extracting type I collagen from an avian source, and more particularly to a process for processing poultry feet to isolate therefrom type I collagen useful for medical and biotechnology applications, cosmetic formulations and food products.

2. Status of Prior Art

Collagen is a substance which accounts for about thirty percent of the total human body protein. Collagen, which has a characteristic amino acid composition, forms the fibrillar component of soft connective tissues such as skin, ligament and tendon, and is the major component of the organic matrix of calcified hard tissues such as bone and dentine.

There exist at least twelve genetically distinct types of collagen. The most familiar, type I, consists of three polypeptide chains. Two chains are identical and are called $\alpha 1(I)$; the third being called $\alpha 2(I)$. I collagen forms the major portion of the collagen of both soft (skin, tendon) and hard (bone and dentine) connective tissue. Type II collagen is the major collagen of cartilage and is composed of three $\alpha$ (II) chains. Type III collagen is composed of three $\alpha 1(III)$ chains and is found in blood vessels, wounds, and certain tumors. Reticulin fibers appear to be identified with type III collagen. Basement membrane collagens are classified as type IV.

The intercellular substances of connective tissue are classified as either amorphous or fibrous. The former exist as firm or soft gels. These are proteoglycans containing bound water which permits diffusion to take place through them. Fibrous intercellular substances are commonly immersed in the amorphous type and assume various forms, such as the white fibers of collagen, yellow fibers constituting an elastin, and reticular fibers in the form of lacy networks that give intimate internal support to cells. Connective tissue cells that generate intercellular substances thereafter lie within the substances they have formed.

Type I collagen, which is a biodegradable polymer, has been used as a plasma expander, a vehicle for drug delivery, as a vitreous body replacement, a hemostatic agent, a suture material, a corneal replacement, a hemodialysis membrane, a wound dressing, an artificial skin, and a hernia patch, as well as a vessel prosthesis, a vaginal contraceptive and an injectable agent for tissue augmentation (Pachence et al., Medical Device and Diagnostic Industry, 9:49 (1987)). In some of these applications, the collagen is reconstituted and cross-linked into an insoluble form.

Collagenous materials have been used for centuries for tissue repair (see Pachence et al., Medical Device and Diagnostic Industry, 9:49 (1987)). The biological properties of collagen include its ability to stimulate wound healing (Doillon and Silver, Biomaterials, 7:3 (1986)), to promote cell attachment (Kleinman et al., J. Cell Biology, 88:473 (1981)), to attract inflammatory cells (Hopper et al., Immunology, 30:249 (1976)), and to act as a substrate that supports new cell growth (Elsdale and Bard, J. Cell Biology, 54:626 (1976).

Cell infiltration and tissue attachment to collagenous matrices is an important characteristic of type I collagen (Yannas, in *The Surgical Wound*, ed. Dineen and Hildick-Smith, Lea and Febeger, Inc., p. 171 (1981); and Doillon et al., Scanning Electron Microscopy, 3:1212 (1984)).

Despite its significant advantages, the commercial success of collagen-based materials has been limited to a few specialized products that make use of collagen's unique properties. The major reasons for the lack of commerciall available collagen-based medical and biotechnology products are as follows:

1. The high cost of preparation of pure type I collagen from bovine and porcine sources as compared to the cost of synthetic biomaterials.
2. The variability of isolated collagen;
3. The difficulties of handling and storing collagen as compared to synthetic materials.

Of prior art background interest are the Robertson U.S. Pat. Nos. 4,216,204; 4,555,303 and 4,094,973, which disclose producing protein hydrolysate from poultry feet.

SUMMARY OF THE INVENTION

In view of the foregoing, the main object of this invention is to provide a process for producing type I collagen which is more efficient and cost effective than processes heretofore known for this purpose.

More particularly, an object of this invention is to provide a process for extracting type I collagen from a readily available avian source, preferably poultry feet, which process obviates many of the difficulties encountered with prior art techniques.

Also an object of the invention is to provide a process for producing type I collagen medical and biotechnology products that are non-toxic, biocompatible and adapted to promote cell growth.

Yet another object of the invention is to provide a hydrophilic type I collagen powder capable of absorbing as much as fifteen times its weight in liquid, the powder being useful as a wound exudate control material that not only functions to withdraw exudate from a wound, but also to promote the healing thereof.

A significant advantage of a type I collagen in accordance with the invention is that it lends itself to impregnation with enzymes, growth factors, anti-cancer agents and other compounds exhibiting pharmaceutical activity or which alter cell activity.

A further object of the invention is to provide type I collagen medical and biotechnology products useful for general surgery, dermatology, dentistry, plastic and reconstructive surgery, neurosurgery, orthopedics, ophthalmology urology, vascular surgery, veterinary medicine, and other related fields.

Briefly stated, these objects are attained in a process for extracting type I collagen from an avian source such as poultry feet that incorporates a fibrillar mass of connective tissue as well as bony tissue to yield a collagen product having useful medical and biotechnology applications. In this process, after being cleaned and decontaminated, the poultry feet are comminuted and then enzyme-treated to enhance the yield. The enzyme-treated comminuted material which is rich in collagen is dispersed in an organic acid to cause the fibrillar mass to undergo controlled swelling, after which the mass is separated from the bony tissue and purified to remove non-collagenous material. The purified mass is dried to provide the desired Type I collagen product which may be ground into a powder or formed into a collagen matrix or sponge, depending on the end use therefor.

DETAILED DESCRIPTION OF INVENTION

The avian source from which type I collagen is extracted is preferably feet from freshly slaughtered poultry (i.e., less than 8 hours from slaughter). The avian feet are washed thoroughly with tap water (temperature less than 70° F.), until all feathers and surface debris are removed. In order to remove bacterial contaminants, the avian feet are then soaked in 50-100 ppm of sodium hypochlorite at pH 7-8, with agitation. Then the avian feet are rinsed thoroughly with pyrogen-free water.

The cleaned and decontaminated feet are then ground, using a commercially available grinder for this purpose. The comminuted avian feet are again washed with 50-100 ppm of sodium hypochlorite at pH 7-8, with agitation. An optional wash with 70% ethanol/30% pyrogen-free water may follow if the pyrogen load of the material is high.

The comminuted avian feet are then treated with a protease or proteinase, such as ficin or papain. These enzymes act to increase the yield of type I collagen from the connective tissue. For example, the comminuted avian feet are mixed with pyrogen-free water in a ratio of between 1:10 to 1:50 (w:w), at a temperature of between 27° to 45° C. The pH of the mixture should be between 6 to 7, and the pH is stabilized using common buffers such as potassium phosphate or sodium bicarbonate. While agitating, the protease is added to the mixture in a ratio of 1:10 to 1:50 wt protein/wt solution. This mixture is allowed to react at temperature of 20° to 45° C. for 0.5 to 24 hours, after which the matter floating on the top of the vessel is skimmed off, and the comminuted avian feet are rinsed thoroughly.

The enzyme is then inactivated by adding pyrogen-free water in a ratio of between 1:10 to 1:50 (w:w), and adding ammonium nitrate and sodium chlorite in ratios of 1:100 and 1:1000 (w:w) compared to water weight, at a temperature of between 20° and 40° C. The top layer of matter is again skimmed, and the comminuted avian feet are washed thoroughly with pyrogen-free water.

The enzyme-treated comminuted avian feet are then dispersed in an organic acid (e.g., 1% acetic acid) in which the fibrillar mass is allowed to undergo controlled swelling for 1 to 12 hours at temperatures of 15° to 50° C., being careful not to denature the collagen. This step is followed by separation of the connective tissue from the bony tissue, using standard techniques such as centrifugation filtration, or other separation technique.

Further purification of the connective tissue collagen is then carried out by precipitation. First, the non-collagenous material is precipitated from the solution by gradually increasing salt (e.g., ammonium sulfate) concentrations, ranging from 0.5% to 10%; the non-collagenous precipitate is discarded. The collagen can also be precipitated by bringing the pH to 4.5 or by adding an alcohol (e.g., ethanol isopropanol), or by combining methods. If further purification is desired, then the collagen can be re-dispersed in organic acid, and reprecipitated (using either increased ionic strength, pH change, and/or adding an alcohol). Finally, the precipitated collagen is washed thoroughly using pyrogen-free water, at neutral pH (where little collagen goes into solution). The procedure described above is with respect to connective tissue fibrillar mass extracted from the poultry feet, this mass having been separated from the bony tissue.

Type I collagen can also be extracted from the bony tissue by first decalcifying this tissue. To this end, the bony tissue is treated with a solution containing HCl (0.5 to 4.0N) and EDTA (0.1 to 5 M) for 2 to 12 hr. at 25° C. After washing three times with 1 mM HCl, the decalcified bone is ground to a fine powder, then swollen in organic acid, as described previously in connection with the fibrillar mass, and precipitated using salt fractionatio pH change, and/or adding an alcohol, as above. The resultant collagen is washed thoroughly using pyrogen-free water.

Type I collagen derived from either the fibrillar mass of connective tissue or the bone fraction is then soaked in alcohol, preferably isopropyl alcohol, for 1 to 12 hours. The type I collagen is separated from the alcohol by filtration, decantation or other suitable techniques, and air dried at temperatures less than 45° C. The dried type I collagen is then subjected to grinding to form a powder.

As an alternate to drying and grinding to form a powder, the type I collagen from either connective tissue or bone can be redispersed with organic acid, and this dispersion can then be used to form a collagen matrix or sponge by freeze-drying in the manner disclosed in the Silyer et al. U.S. Pat. No. 4,703,108.

In accordance with the invention, it is essential that the collagen matrix or sponge be crosslinked using a procedure which will keep the material free of potentially toxic additives which may impair tissue ingrowth or preclude complete resorption upon topical application, or implantation. Thus, for example, the following substances may be added to the above dispersion to effect crossslinking: carbodiimides, such as cyanamide or 1-ethyl-3-(3-dimethylamino-propyl-carbodiimi hydrochloride, with concentrations in the dispersion of between 0.01 to 10% (W/V); a bifunctional N-hydroxy succinimide-derived ester such as bis(sulfosuccinimidyl) suberate, with concentrations in the dispersion of between 0.01 to 10% (S/V); or N-hydroxysuccinimide, with concentrations in the dispersion of between 0.01 to 10% (W/V), when succinylated collagen is used.

Succinylated collagen is produced by treating the isolated, purified collagen with a solution of succinic anhydride (p.1 to 10% W/V) at 15° to 40° C. for 0.5 to 10 hours; the collagen is washed with distilled water to remove unreacted succinic anhydride.

Macromolecules, such as hyaluronic acid, fibronectin, collagen types IV and V, laminin, and proteoplycans can be incorporated into the collagen dispersion, prior to drying the collagen or formation of the matrix, in amounts of 0.01% to 2.0% by volume of the dispersion. Likewise, pharmacologically active agents such as platelet-derived growth factor, epidermal growth factor, transforming growth factor beta, angeogenesis factor, antibiotics, antifungal agents, spermicidal agents, hormones, enzymes or enzyme inhibitors can also be incorporated into the collagen dispersion prior to formation of the matrix. The amounts vary from about 1.0 ng/ml to 0.1 mg/ml for the growth factors, and 0.001 mg/ml to 10 mg/ml for hormones, enzymes, and enzyme inhibitors.

EXAMPLES

Example 1

Precipitation of Avian Collagen

Soluble avian collagen (1% w/v) in 1% acetic acid is precipitated by adding a 5 M NaOH until the pH is raised to 6.0. The mixture is allowed to incubate at 37° C. for 30 minutes until a visible precipitate is formed. After the precipitate is formed, it is separated from the supernatant by centrifugation at 10,000 rpm for 30 minutes or until a solid pellet is produced. The pellet is air dried at room temperature until the moisture content is below 15%. The material is then stored at −20° C. until it is used.

Alternatively, the precipitate can be formed by the addition of 0.2 M NaCl to a solution containing 1% collagen, followed by the addition of 80% ethanol by volume water approximately 30 minutes at 37° C. Separation is effected by decanting the excess fluid, centrifuging, then allowing the residue to air dry until the moisture content is less than 15%.

The intrinsic viscosity of this material was measured, and found to be 1100 ml/g. Pure type I collagen is in the range of 1100 to 1500 ml/g, while gelatin is 50 ml/g. In addition, the collagenase degradation rate, as defined in the above-identified Berg et al. patent, was 30 minutes for the material isolated by this patented procedure. This is the same as pure native type I collagen, while the collagenase degradation time of gelatine is 5 minutes. Finally, the amino acid analysis of the material isolated from the procedure matched that of type I collagen. These results indicate that highly purified, native type I collagen is the product of this procedure.

EXAMPLE 2

Preparation of an Avian Collagen Dispersion

The dried material of Example 1 is added to 1% acetic acid, in a concentration of 1% (w/v); the material is allowed to swell for approximately 1 hour. This material can then be blended, using a standard commercial blender at high speed, until a smooth dispersion is formed.

Other macromolecules, such as hyaluronic acid and/or fibronectin, can be added to this dispersion, prior to forming the medical product. For example, hyalurinoc acid can be added to the collagen in a ratio of 1:5. After the addition of the hyaluronic acid, the dispersion is blended for 1 minute at high speed at %° C. under $N_2$ atmosphere (1 atm).

A collagen matrix containing this formulation of hyaluronic acid significantly promotes the growth of fibroblasts as compared with the collagen matrix alone (Doillon et al. I(1987) Biomaterials 8:195-200). Such a matrix also enhances wound healing in guinea pigs (Doillon et al. (1986) Biomaterials 7:3-8).

EXAMPLE 3

Preparation of the Collagen Dispersion Containing Fibronectin

To the dispersion formed in Example 2, 12 mg of fibronectin is added just prior to addition of the solution containing the crosslinking agent(s). After addition of the fibronectin, the dispersion is blended for 1 minute at high speed at 5° C. under $N_2$ atmosphere (1 atm).

A collagen matrix containing this formulation of fibronectin significantly promotes the growth of fibroblasts as compared with the collagen matrix alone (Doillon et al. (1987) Biomaterials 8:195-200). Such a matrix also enhance wound healing in guinea pigs (Doillon et al. (1986) Biomaterials 7:3-8).

EXAMPLE 4

Formation of the Collagen Matrix

Approximately 250 ml of the collagen dispersion (as prepared in the previously Detailed Description section, or in Examples 2 to 3) is poured into trays of dimensions 9 in × 15 in. × 1 in (W × L × H) and then placed into a freezer unit at −50° C. After 2 hours, the frozen dispersion is then freeze dried at temperatures of 10° C. to 40° C. under vacuum.

EXAMPLE 5

Crosslinking of the Collagen Matrix by Heat and Dehydration

The collagen matrix material of example 4, placed in trays, is fed through an oven having a temperature gradient from 40° C. to 105° C. (+6.5° per foot), then back down to 0° C. (−6.5° per foot). Dry $N_2$ gas is flowed over the trays while in the oven (the gas is kept dry by passing it over a dessicant such as silica gel). The trays are moved through the oven at a rate of 0.5 feet per hour, so that each tray is subjected to an average temperature of about 100° C. for at least 10 hours.

EXAMPLE 6

Preparation of Collagen Film

The dispersion of examples, 2, 3 or 4 are poured into a flat, level rectangular container, dimensions 9 in. × 10 in. × 1 in. The container with the dispersion is subjected to laminar air flow at a temperature of 37° C. until the water content is less than 15%.

EXAMPLE 7

Preparation of Avian Collagen Powder

The dried material of example 1 or the film of example 6 is soaked in isopropyl alcohol for 2 hours, then air dried for 2 hours at 37° C. The material is then placed in a standard grinding device, or knife mill, to form small particles. In practice, it may be necessary to cool the grinding device or knife mill while processing to minimize frictional heat which can denature the collagen. This material is then sieved to produce powders with a defined range of particle sizes. The matrix of example 4 can also be milled, which will produce a flake-like material.

EXAMPLE 8

Use of the Avian Collagen Powder for Wound Exudate Control

Many deep wounds, especially those which are or have been infected, exude a large quantity of fluid. One important aspect of wound care is to carefully control the amount of wound exudate to avoid fluid pooling. A dry collagen powder, such as the one of example 7, is hydrophilic and can absorb up to 15 times its weight in liquid. It is therefore an excellent wound exudate control material.

The powder is spread into the wound, and covered with a standard dressing or with a dressing to effect moisture transmission control as disclosed in the copending application to Berg et al. Ser. No. 095,779, Sept. 11, 1987, now U.S. Pat. No. 4,841,962. After 6 to 12 hours, the collagen type I powder can be flushed from the wound using isotonic saline. This procedure is repeated until the wound begins healing.

While there have been shown preferred embodiments of a process for producing type I collagen from an avian source and applications therefor, it will be appreciated that many changes and modifications may be made therein without, however, departing from the essential spirit thereof.

We claim:

1. A process for extracting type I collagen from a bony avian source wherein said bony avian source incorporates a fibrillar mass of connective tissue and bony tissue, said process being effective to yield a collagen product in powder form, said process comprising the steps of:
   (a) cleaning and decontaminating the fibrillar mass;
   (b) comminuting the decontaminated fibrillar mass;
   (c) dispersing the decontaminated mass in an acid to cause the fibrillar mass to undergo swelling to become a swelled mass comprising connective tissue and bony tissue but wherein the collagen is not denatured;
   (d) separating the connective tissue from the bony tissue;
   (e) decalcifying the body tissue;
   (f) grinding the decalcified body tissue into powder;
   (g) swelling the powder in acid to produce swollen powder; and
   (h) precipitating the swollen powder.

2. A process as set forth in claim 1, wherein said avian source is body tissue which is obtained from or is existing in poultry feet.

3. A process as set forth in claim 3, step (c) wherein said dispersing is carried out at temperature between 15° C. and 50° C.

4. A process as set forth in claim 2, further including the step of converting the swollen powder from the bony tissue into a matrix by redispersing it with organic acid followed by freeze drying.

5. A process as set forth in claim 4, wherein the matrix is subjected to crosslinking by chemical reaction and heating under vacuum.

6. A process as set forth in claim 2, further including the step of converting the swollen powder from the bony tissue to a semi-dry film whose water content is less than 15%.

7. A proceeds as set forth in claim 2, wherein the fibrillas mass is enzyme-treated after being comminuted to enhance the yield of collagen.

8. A process as set forth in claim 2, wherein the acid is acetic acid.

9. A process as set forth in claim 2, wherein the acid is hydrochloric acid.

10. A process as set forth in claim 2, wherein there is a purifying step after the separating step (d) and before the decalcifying step (e) and wherein said purifying is effected by precipitation.

11. A process as set forth in claim 2, wherein precipitation is effected using salt fractionation.

12. A process as set forth in claim 1, wherein the swollen powder is concentrated by precipitation which is effected by raising the pH.

13. A process as set forth in claim 1, wherein precipitation is effected by an addition of alcohol.

14. A process as set forth in claim 1, wherein precipitation is effected by addition of salt.

* * * * *